United States Patent [19]
Kimura et al.

[11] Patent Number: 5,661,821
[45] Date of Patent: Aug. 26, 1997

[54] STILL IMAGE FILING SYSTEM

[75] Inventors: Tomohiro Kimura; Akio Fukushima; Toshihiko Maruyama, all of Tokyo, Japan

[73] Assignee: Pioneer Electronic Corporation, Tokyo, Japan

[21] Appl. No.: 924,763

[22] Filed: Aug. 4, 1992

[30] Foreign Application Priority Data

Nov. 26, 1991 [JP] Japan ................................ 3-310995
Nov. 28, 1991 [JP] Japan ................................ 3-314901

[51] Int. Cl.$^6$ ................................................ G06T 9/00
[52] U.S. Cl. ........................... 382/232; 382/305; 358/403; 358/432
[58] Field of Search ..................... 382/56, 1, 57, 382/232, 250, 305, 309, 311; 358/909, 401, 403, 467, 452, 460, 432; 395/153, 155, 145, 146, 147

[56] References Cited

U.S. PATENT DOCUMENTS

| | | | |
|---|---|---|---|
| 4,553,206 | 11/1985 | Smutek et al. ........................... | 395/275 |
| 4,602,333 | 7/1986 | Komori ................................... | 382/56 |
| 4,910,608 | 3/1990 | Whiteman et al. ..................... | 382/56 |
| 4,996,714 | 2/1991 | Desjardins et al. .................... | 382/56 |
| 5,038,222 | 8/1991 | Saito ...................................... | 358/401 |
| 5,138,459 | 8/1992 | Roberts et al. ........................ | 358/140 |
| 5,150,434 | 9/1992 | Hori et al. .............................. | 382/61 |
| 5,175,632 | 12/1992 | Hayashi et al. ....................... | 358/401 |

*Primary Examiner*—Michael T. Razavi
*Assistant Examiner*—Jon Chang
*Attorney, Agent, or Firm*—Sughrue, Mion, Zinn, Macpeak & Seas

[57] ABSTRACT

A still image filing system in which the data compressed by a compressor for data recording is supplied to a reconstructing device prior to recording to a recording medium and reconstruction still image data is generated from the reconstructing device. Before the non-compression still image data is compressed and recorded to the recording medium, consequently, a still video image by the compressed data can be easily checked.

3 Claims, 11 Drawing Sheets

STILL IMAGE FILING SYSTEM

BACKGROUND OF THE INVENTION

1. Field of the Invention

The invention relates to a still image filing system for compressing still image data and recording onto a recording medium and for reading out the recorded data from the recording medium and reconstructing the still image data.

2. Description of the Related Art

There is a still image filing system in which still image data is compressed and recorded as a file onto a disk and the data read out from the disk can be reconstructed as still image data. For instance, as shown in FIG. 1, an analog video signal showing a still image is supplied from an input terminal AIN to an A/D converter 1 and converted into a digital signal. The digital signal is once written as still image data into a frame memory 2 through a switch SW. When still image data is supplied to an input terminal DIN, it is directly written into the frame memory 2 through the switch SW. The written still image data is read out from the frame memory 2 and compressed by a compressor 3. The compression is executed on the basis of a method specified by, for instance JPEG (Joint Photographic Experts Group). The still image compression data generated from the compressor 3 is supplied to a disk drive 4 and written onto the disk. The writing and reading operations of the disk drive 4 are instructed by a microcomputer (not shown). In case of reproducing an analog video signal indicative of a still image from the data recorded on the disk, the switch SW is switched and an output of a reconstructing device 5 is relay-connected to the frame memory 2. When the disk drive 4 reads out the written still image compression data from the disk, the data is supplied to the reconstructing device 5. The reconstructing device 5 reconstructs the still image compression data to the still image data by an expanding operation opposite to the compressing operation of the compressor 3. The reconstructed still image data is written into the frame memory 2 through the switch SW. After that, it is read out from the frame memory 2 and supplied to a D/A converter 6. A reproduction analog video signal from the D/A converter 6 is generated from an output terminal OUT to a display device (not shown) such as a CRT display or the like.

In such a still image filing system, however, the data is recorded on the recording medium such as a disk or the like without checking a deterioration of a still video image due to the data compressing operation in the compressor 3 in the data recording mode. Particularly, there is a case where a method in which data cannot be completely reconstructed the JPEG standard is used as a compressing method. In such a case, the deterioration of the still video image due to the compression needs to be checked in the recording mode.

In case of editing the still image data recorded on the disk and then recording to another disk, two still image filing systems are ordinarily used. The data recorded on the disk by one of the still image filing systems is reproduced as an analog video signal, the analog video signal is transferred to the other still image filing system and is again compressed, and after that, the compressed signal is recorded to another disk.

When the method in which the data cannot be perfectly reconstructed as mentioned above is used as a compressing method, although a deterioration of the still video image due to a single compressing and reconstructing process is inconspicuous, by repeating the compressing and reconstructing process many times, the deterioration of the still video image becomes conspicuous. It is, therefore, desirable to avoid a method such that the recorded still image compression data is once reproduced as an analog video signal and, thereafter, it is again compressed and recorded onto the recording medium.

In case of directly recording the digital video signal as it is, further, since there are non-compression data and compression data as digital video signals, prior to editing, the user needs to previously check whether the still video image recorded on the recording medium has been recorded as compression data or not.

SUMMARY OF THE INVENTION

It is an object of the invention to provide a still image filing system which can easily check a still video image based on compression data before still image compression data is recorded onto a recording medium.

Another object of the invention is to provide a still image filing system which can efficiently edit still image data recorded on a recording medium and can record onto another recording medium.

According to the invention, there is provided a still image filing system comprising: compressing means for compressing still image data supplied in a data recording mode and for generating compression data; driving means for recording the compression data onto a recording medium in the data recording mode and for reading out the data recorded on the recording medium in a data reproducing mode; and reconstructing means for reconstructing non-compression data from the compression data read out in the data reproducing mode and for generating as reconstruction still image data, wherein in the data recording mode, the compression data which is generated from the compressing means is supplied to the reconstructing means before it is recorded onto the recording medium, and the reconstruction still image data is obtained from the reconstructing means.

In the still image filing system of the invention, in the data recording mode, the compression data which is generated from the compressing means is supplied to the reconstructing means prior to recording to the recording medium, so that the reconstruction still image data is derived and data-compressed, the still video image by the still image data which has been obtained by reconstructing the compression still image data can be checked before it is actually recorded onto the recording medium.

According to another aspect of the invention, there is also provided a still image filing system comprising: compressing means for compressing a still image non-compression data and for generating compression data; reconstructing means for reconstructing the still image non-compression data from the compression data; driving means for recording data which is supplied in a data recording mode onto a recording medium and for reading out the recorded data from the recording medium in a data reproducing mode; an input terminal to receive data to be recorded; and an output terminal for outputting the read-out data, wherein the still image filing system further comprises means for generating a reproduction format signal indicating whether the read-out data from the recording medium is the non-compression data or the compression data in the data reproducing mode before the read-out data from the output terminal is output, discriminating means for discriminating whether the data which is supplied in accordance with the reproduction format signal in the data recording mode is the compression data or not, and switching means for connecting the input terminal to an input of the driving means when the result of the discrimination of the discriminating means indicates the supply of the compression data and for connecting the input terminal to the compressing means and also connecting an output of the compressing means to the input of the driving means when the result of the discrimination of the discriminating means indicates the supply of the non-compression data.

In the still image filing system of the invention, on the reproducing side, the reproduction format signal indicating whether the read-out data from the recording medium is the non-compression data or the compression data is generated before the read-out data from the output terminal is generated. On the recording side, a check is made to see if the data which is supplied in accordance with the reproduction format signal is the compression data or not. When the result of the discrimination indicates the supply of the compression data, the input terminal is connected to the input of the driving means, so that the compression data is recorded as it is onto the recording medium by the driving means. When the discrimination result indicates the supply of the non-compression data, the input terminal is connected to the compressing means, the output of the compressing means is connected to the input of the driving means, and the non-compression data is converted into the compression data by the compressing means, and thereafter, the compression data is recorded onto the recording medium by the driving means.

DETAILED DESCRIPTION OF PREFERRED EMBODIMENTS

A first embodiment of the present invention will be described in detail hereinbelow with reference to the drawings.

Figure 1:
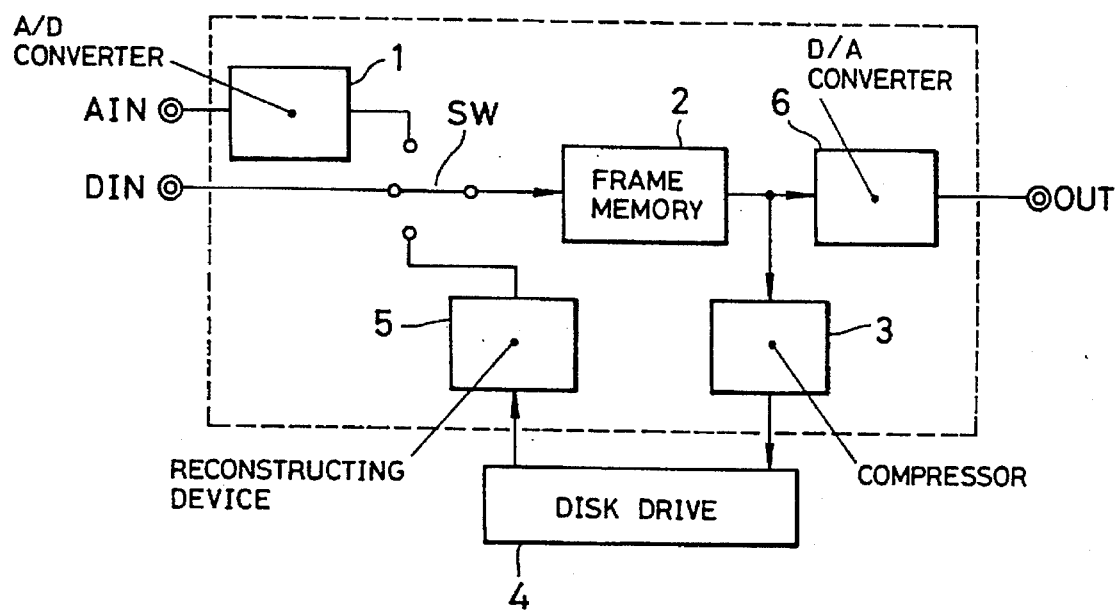
FIG. 1 is a block diagram showing a construction of a conventional still image filing system.
Figure 2:
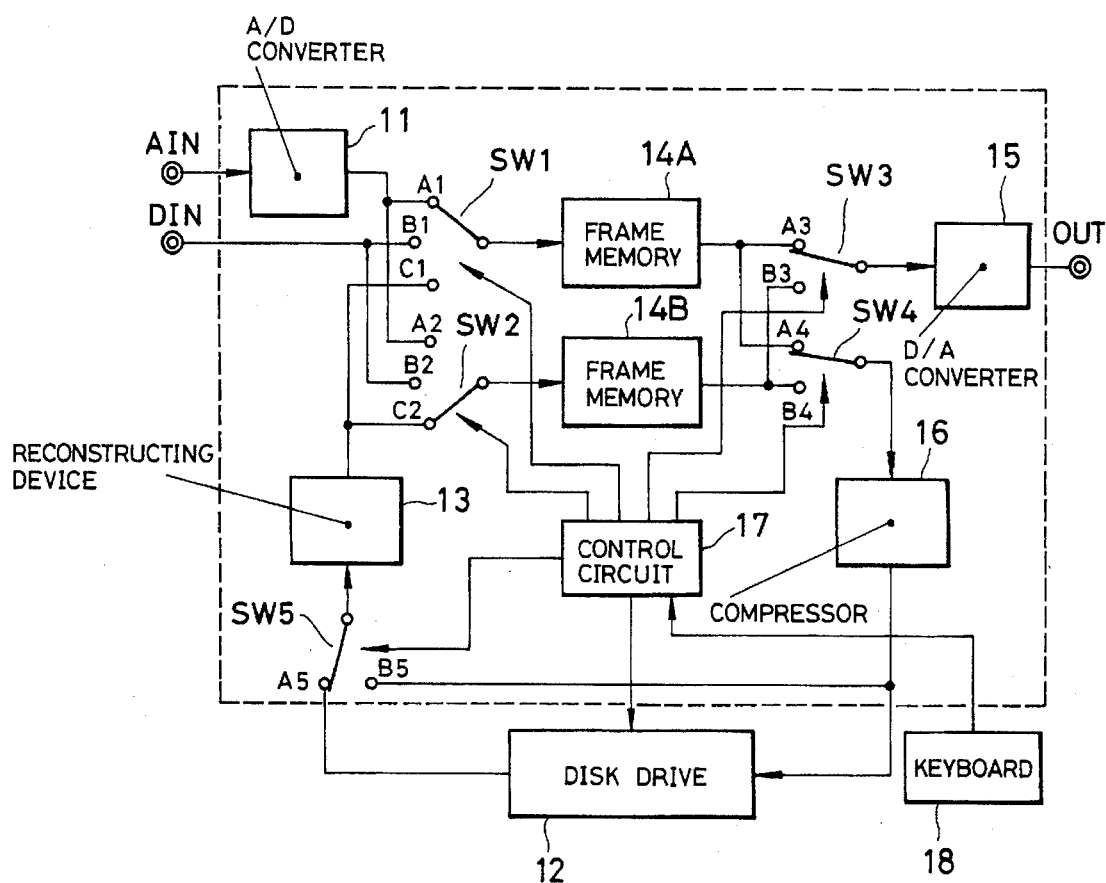
FIG. 2 is a block diagram showing a first embodiment of the invention.

FIG. 2 shows a still image filing system according to the invention. In the still image filing system, the analog input terminal AIN and the digital input terminal DIN are provided. An A/D converter 11 is connected to the analog input terminal AIN. Switches SW1 and SW2 are connected to an output of the A/D converter 11. The digital input terminal DIN is directly connected to the switches SW1 and SW2.

The switch SW1 has three fixed contacts A1, B1, and C1. The switch SW2 also has three fixed contacts A2, B2, and C2. The A/D converter 11 is connected to the fixed contacts A1 and A2. A signal supplied from the digital input terminal DIN is sent to the fixed contacts B1 and B2. A digital video signal which has been reconstructed by a reconstructing device 13 is supplied to the fixed contacts C1 and C2.

A frame memory 14A is connected to a selection output of the switch SW1. A frame memory 14B is connected to a selection output of the switch SW2. The writing and reading operations of the data of the frame memories 14A and 14B are controlled by a writing and reading circuit (not shown). Switches SW3 and SW4 are connected to read outputs of the frame memories 14A and 14B. The switch SW3 has two fixed contacts A3 and B3. The switch SW4 also has two fixed contacts A4 and B4. The fixed contacts A3 and A4 are connected to the frame memory 14A. The fixed contacts B3 and B4 are connected to the frame memory 14B. A D/A converter 15 is connected to a selection output of the switch SW3. The D/A converter 15 converts the digital video signal read out from the frame memory 14A or 14B into the analog signal and supplies to the output terminal OUT. A compressor 16 is connected to a selection output of the switch SW4. The data compressed by the compressor 16 is supplied to a disk drive 12. The disk drive 12 writes the signal from the compressor 16 onto a disk such as a rewritable magneto-optic disk or the like in the data recording mode. Further, the disk drive 12 reads out the recorded data from the disk in the data reproducing mode. A switch SW5 is connected to the read output of the disk drive 12. The switch SW5 has two fixed contacts A5 and B5. The read-out data is supplied from the disk drive 12 to the fixed contact A5. The compression data is supplied from the compressor 16 to the fixed contact B5. A selection output of the switch SW5 is connected to the reconstructing device 13.

Switching operations of the switches SW1 to SW5 are controlled by a control circuit 17. The control circuit 17 is constructed by, for example, a microcomputer and operates as will be explained hereinlater in accordance with a key operation of a keyboard 18. The keyboard 18 has keys such as recording key, check key, execution key, reproduction key (all of them are not shown), etc., which will be explained hereinlater. A section surrounded by a broken line in FIG. 2 is formed in one body.

Figure 3:
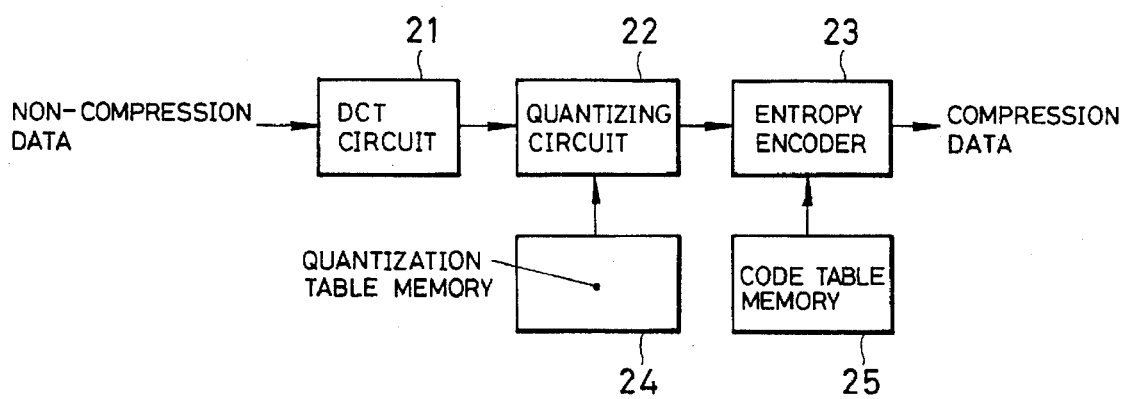
FIG. 3 is a block diagram showing a construction of a compressor in a system of FIG. 2.

The compressor 16 is based on the JPEG standard and comprises a DCT (Discrete Cosine Transform) circuit 21, a quantizing circuit 22, an entropy encoder 23, a quantization table memory 24 and a code table memory 25 as shown in FIG. 3. The DCT circuit 21 divides the still image data into blocks of 64 (8×8) pixels and two-dimensionally DCT transforms every block. By the above DCT transformation, the 64 pixel data are transformed into 64 DCT coefficients. One coefficient in the upper left block of the image indicates a DC component and the remaining blocks indicate AC components. The quantizing circuit 22 linearly quantizes the 64 DCT coefficients using different step sizes for every coefficient position by utilizing a quantization table. The quantization table has previously been written in the memory 24. The quantized DCT coefficients are supplied to the entropy encoder 23, by which they are Huffman encoded in accordance with a code table which has previously been stored in the memory 25 and the resultant encoded data becomes still image compression data.

Figure 4:
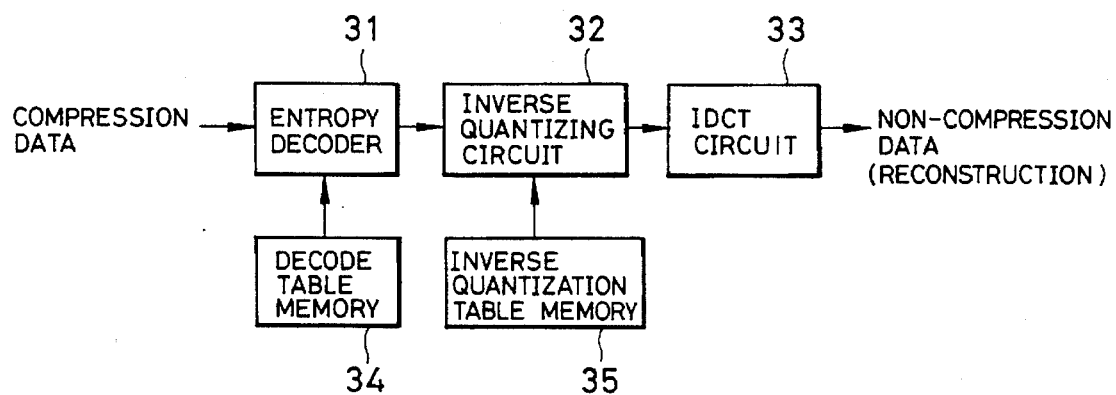
FIG. 4 is a block diagram showing a construction of a reconstructing device in the system of FIG. 2.

As shown in FIG. 4, the reconstructing device 13 comprises an entropy decoder 31, an inverse quantizing circuit 32, an IDCT (Inverse Discrete Cosine Transform) circuit 33, a decode table memory 34 and an inverse quantization table memory 35. The entropy decoder 31 Huffman decodes the still image compression data in accordance with a decoding table which has previously been stored in the memory 34. The decoded data is the quantized DCT coefficients and they are inversely quantized by the inverse quantizing circuit 32 by using an inverse quantization table which has previously been written in the memory 35. The inversely quantized data is supplied to the IDCT circuit 33 and converted into the still image non-compression data.

The reconstructing device 13 and compressor 16 have practically been disclosed in the publications of Omachi and Ono, "Explanation of International Standard System of Color Still Image Encoding (part 1)", the Magazine of the Society of Video Electronics of Japan, Vol. 20, No. 1, pages 50–58, 1991, JP-A-63-103583, and the like.

A file format of the still image data will now be described. A file construction comprises a volume portion, a compression parameter portion, a disk correspondence table portion, a directory portion, and a data portion. One volume portion is provided for a fixed sector address of the disk. Management information regarding the whole disk has been recorded in the volume portion. The volume portion has an area for a management flag consisting of four bytes. The management flag indicates whether at least one still image data compressed by one (eight bits) of the four bytes is included or not. Further, the volume portion has a data information portion to record a directory head sector address, a directory area size, the number of registration directories, a data head sector address, a data portion space head sector address, and a data space size.

The compression parameter portion which has a size of one sector, is provided in a predetermined sector address for every disk and records necessary default compression parameters for reproducing the compressed data. The compression parameters consist of the inverse quantization table and the Huffman decoding table mentioned above. The disk correspondence table portion is provided for a disk in which reproduction control information exists and specifies an image recording disk and an audio recording disk which are used for the reproduction control. The directory portion is a table indicative of a head sector address of each file of the data portion.

The data portion consists of a data header and a data main body portion for every file. A main body header is provided in the data main body portion in dependence on the kind of data. The data header has an area due to the kind of data to record a head sector address of the next file, kind of data, main body header size, size of main body data, and the like. As kinds of data, there are compression data, non-compression data, reduction data, and the like.

The file format is based on the high vision still image disk system described in several technical reference by NHK (Nippon Hoso Kyokai).

The operations in the recording and reproducing modes of the still image filing system according to the invention mentioned above will now be described. A CRT display (not shown) is connected to the output terminal OUT.

Figure 5:
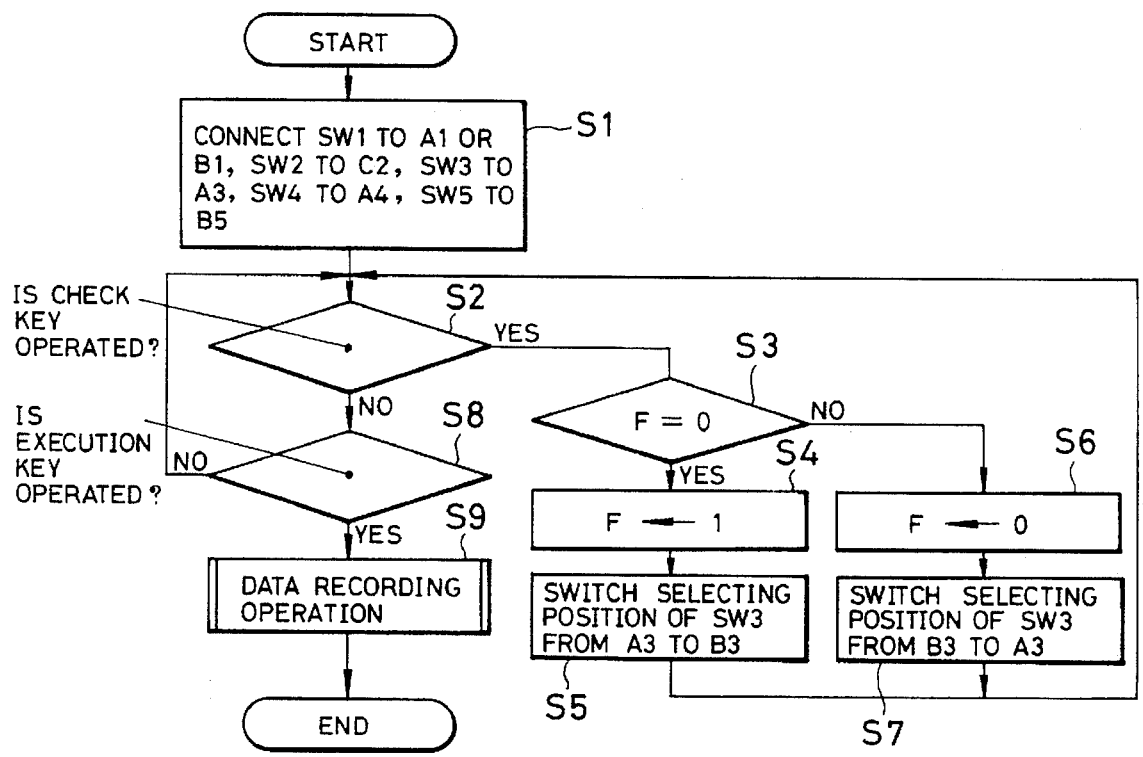
FIG. 5 is a flowchart showing the operation in the recording mode of a control circuit.

When the control circuit 17 detects the operation of a recording key of the keyboard 18, as shown in FIG. 5, the control circuit 17 first controls the switches SW1, SW2, SW3, SW4, and SW5 to the respective selected positions such as fixed contact A1 or B1, fixed contact C2, fixed contact A3, fixed contact A4, and fixed contact B5 (step S1). For example, the analog video signal supplied to the input terminal AIN is sampled by the A/D converter 11 and converted into the still image data as a digital video signal.

After that, the still image data is supplied to the frame memory 14A through the switch SW1. The still image data which is supplied is sequentially written into the frame memory 14A at predetermined writing timings. The still image data of one frame which forms a still video image is held in the frame memory 14A. The still image data held is repetitively read out from the frame memory 14A at predetermined reading timings and supplied to the D/A converter 15 through the switch SW3. The still image data which is supplied is converted into the analog video signal by the D/A converter 15 and generated from the output terminal OUT. The still video image which is indicated by the analog video signal supplied to the input terminal AIN can, consequently, be checked on the CRT display.

The still image data which has been read out from the frame memory 14A is converted into the compression data by the compressor 16. The compression data is supplied to the reconstructing device 13 from the compressor 16 through the switch SW5. The reconstructing device 13 converts the compression data into the non-compression data. The non-compression data, namely, the reconstruction still image data is supplied to the frame memory 14B through the switch SW2. The reconstruction still image data which is supplied is sequentially written into the frame memory 14B at predetermined writing timings. The reconstruction still image data of one frame which forms the still video image is held in the frame memory 14B. The held reconstruction still image data is repetitively read out from the frame memory 14B at predetermined reading timings.

After the recording key of the keyboard 18 was operated, a video check key is operated (step S2). Each time the video check key is operated, the control circuit 17 switches the selecting position of the switch SW3 from the fixed contact A3 to B3 or from the fixed contact B3 to A3 (steps S3 to S7). Therefore, when the switch SW3 is switched from the fixed contact A3 to the selected position of B3, the reconstruction still image data which has been read out from the frame memory 14B is supplied to the D/A converter 15 through the switch SW3. The D/A converter 15 converts the reconstruction still image data which is supplied into the analog video signal and generates from the output terminal OUT. After the image data is converted into the compression data, consequently, the compression data is returned to the non-compression data and the still video image by the resultant video signal corresponding to the non-compression data can be checked on the CRT display. When the switch SW3 is switched from the fixed contact B3 to the selected position of A3, the still image data which has been read out from the frame memory 14A is supplied to the D/A converter 15 through the switch SW3. The original still video image is displayed on the CRT display. Both of the original still video image and the reconstruction still video image after compression can, therefore, be compared by the operation of the video check key.

When an execution key of the keyboard 18 is operated during the video checking operation (step S8), the control circuit 17 starts the data recording operation (step S9). That is, the control circuit 17 instructs the disk drive 12 to write. The disk drive 12, therefore, writes the compression data generated from the compressor 16 as a file onto the disk.

Figure 6:
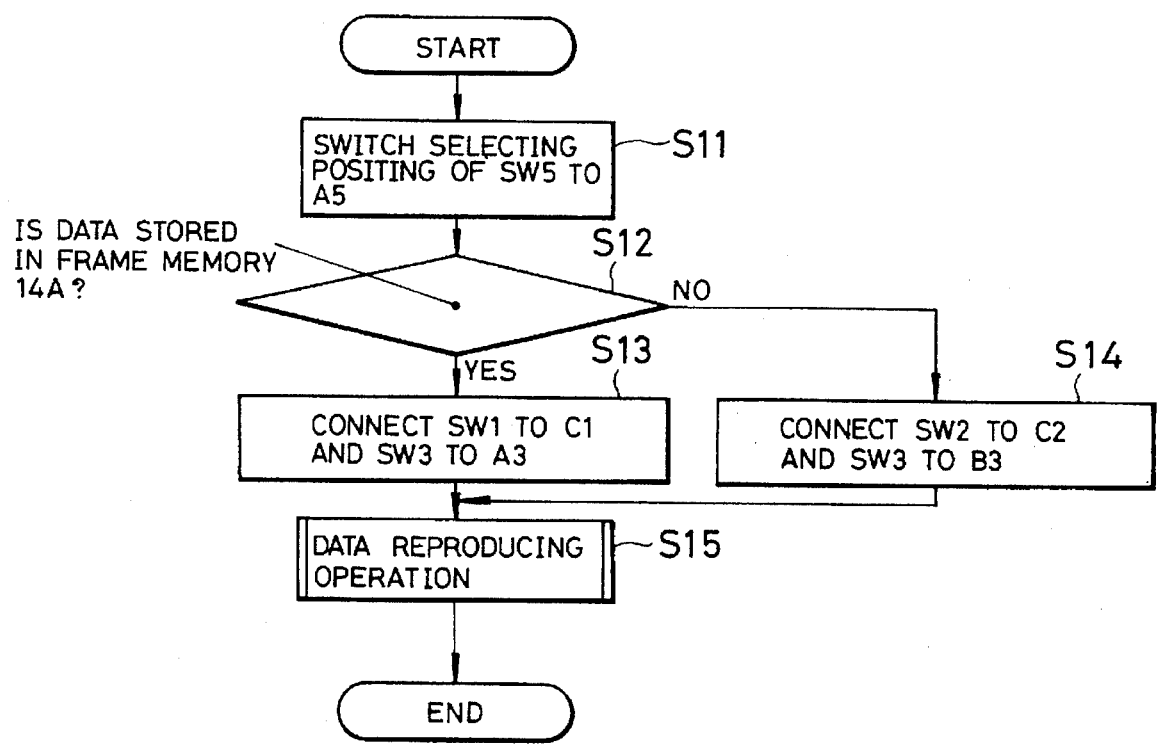
FIG. 6 is a flowchart showing the operation in the reproducing mode of the control circuit.

When a reproduction key of the keyboard 18 is operated, the control circuit 17 switches the switch SW5 to the selected position of the fixed contact A5 as shown in FIG. 6 (step S11). One of the frame memories 14A and 14B in which the reconstruction still image data is stored is selected and set by a predetermined key operation of the keyboard 18 (step S12). When the frame memory 14A is selected, the control circuit 17 controls the switch SW1 to the selected position of the fixed contact C1 and the switch SW3 to the selected position of the fixed contact A3 (step S13). When the frame memory 14B is selected, the control circuit 17 controls the switch SW2 to the selected position of the fixed contact C2 and the switch SW3 to the selected position of the fixed contact B3 (step S14). After that, the data reproducing operation is started (step S15). That is, when the data reproducing operation is started, the control circuit 17, for instance, instructs the disk drive 12 to read out the file designated from the keyboard 18. The compression data, therefore, is read out from the disk drive 12. The compression data is supplied through the switch SW5 to the reconstructing device 13, by which it is converted into the still image non-compression data. When the frame memory 14A is selected, the non-compression data, namely, the reconstruction still image data is supplied to the frame memory, 14A through the switch SW1. The reconstruction still image data which is supplied is sequentially written into the frame memory 14A at predetermined writing timings. The reconstruction still image data of one frame which forms the still video image is held in the frame memory 14A. The reconstruction still image data held is read out from the frame memory 14A at predetermined reading timings and supplied to the D/A converter 15 through the switch SW3. The D/A converter 15 converts the reconstruction still video image which is supplied into the analog video signal and generates from the output terminal OUT. The reproduction still video image, accordingly, can be checked on the CRT display. The processes similar to those in the above case of selecting the frame memory 14A are also executed in case of selecting the frame memory 14B.

In the foregoing embodiment, the first and second frame memories 14A and 14B have been provided. A degree of deterioration of the video image due to the repetition of the compression can be further confirmed by a method whereby a third frame memory is provided, and in the recording mode, the reconstruction still image data held in the second frame memory 14B is again compressed by the compressor 16, the compressed data is reconstructed by the reconstructing device 13 and stored into the third frame memory, the still video images by the still image data stored in the first to third frame memories are compared on the CRT display.

According to the still image filing system of the invention, in the data recording mode, the compression data which is generated from the compressing means is supplied to the reconstructing means prior to recording to the recording medium and the reconstruction still image data is obtained from the reconstructing means, so that the still video image by the still image data which is obtained by compressing the image data and by further reconstructing it can be actually checked before it is recorded to the recording medium. Therefore, a degree of deterioration of the video image due to the data compression recording can be previously known, so that it can be used as a reference in case of deciding a compression ratio of the data recording.

Figure 7:
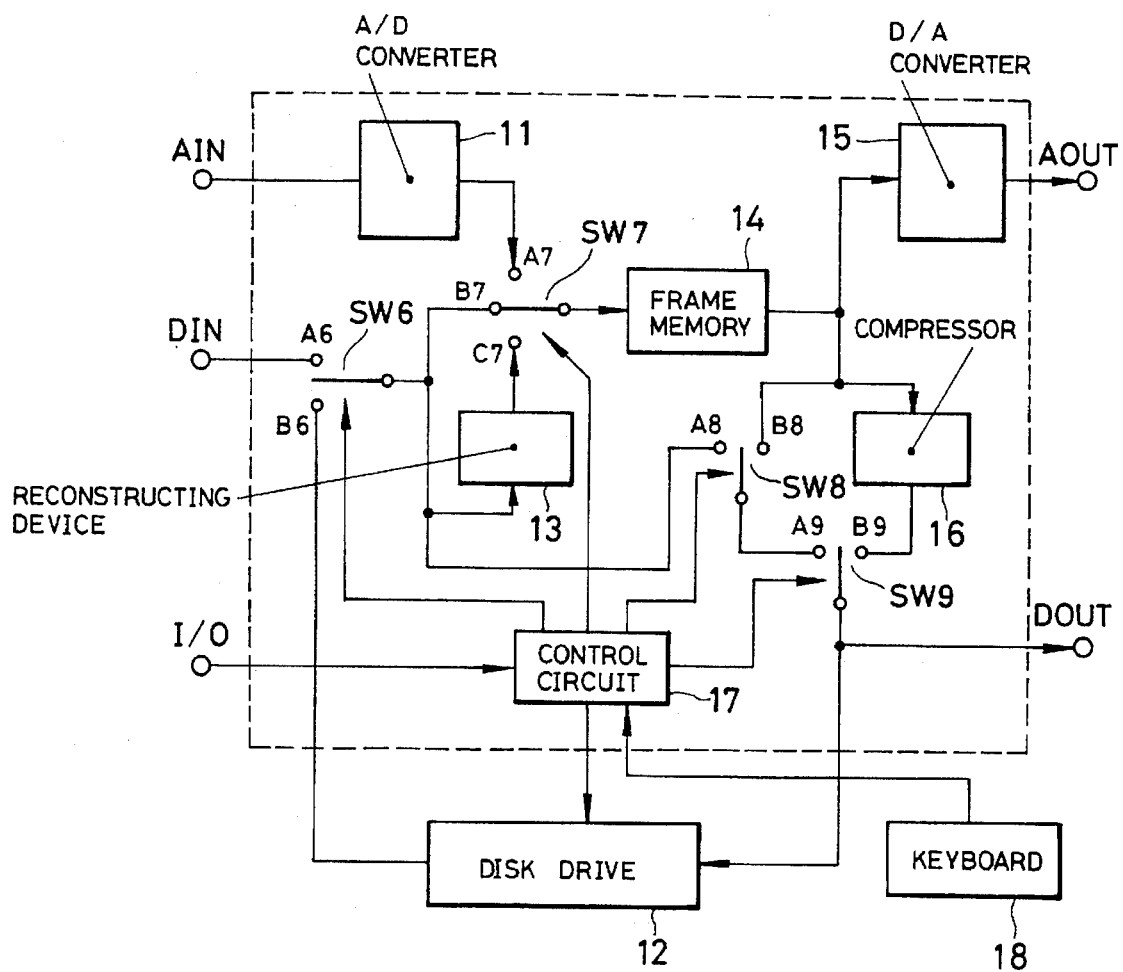
FIG. 7 is a block diagram showing a second embodiment of the invention.

FIG. 7 shows another still image filing system according to the invention. In the still image filing system, a switch SW6 is connected to the digital input terminal DIN. The switch SW6 has two fixed contacts A6 and B6. The signal supplied from the digital input terminal DIN is sent to the fixed contact A6. The signal read out from the disk drive 12 is supplied to the fixed contact B6. The A/D converter 11 is connected to the analog input terminal AIN. A switch SW7 is connected to an output of the A/D converter 11. The switch SW7 has three fixed contacts A7, B7, and C7. The signal which had been supplied from the analog input terminal AIN and has been converted into the digital signal is sent to the fixed contact A7. The signal which has selected by the switch SW6 is supplied to the fixed contact B7. The digital video signal reconstructed by the reconstructing device 13 is supplied to the fixed contact C7. A frame memory 14 is connected to a selection output of the switch SW7. The writing and reading operations of the data of the frame memory 14 are controlled by a writing and reading circuit (not shown). The D/A converter 15, compressor 16, and switch SW8 are connected to a read output of the frame memory 14. The D/A converter 15 converts the digital video signal which has been read out from the frame memory 14 into the analog signal and supplies to the analog output terminal AOUT. The switch SW8 has two fixed contacts A8 and B8. The signal is supplied to the fixed contact A8 from the selection output of the switch SW6. The digital video signal read out from the frame memory 14 is supplied to the fixed contact B8. A switch SW9 is connected to a selection output of the switch SW8. The switch SW9 has two fixed contacts A9 and B9. The signal is supplied to the fixed contact A8 from the selection output of the switch SW8. The digital video signal compressed by the compressor 16 is supplied to the fixed contact B9. The digital output terminal DOUT and disk drive 12 are connected to a selection output of the switch SW9. In the recording mode, the disk drive 12 writes the signal from the selection output of the switch SW9 to the disk such as a rewritable magneto-optic disk or the like. In the reproducing mode, the disk drive 12 reads out the recorded data from the disk and supplies to the reconstructing device 13.

The switching operations of the switches SW6 to SW9 are controlled by the control circuit 17. For instance, the control circuit 17 has a microcomputer and operates as will be explained hereinlater in accordance with a key operation of the keyboard 18. An input/output terminal I/O of the control data is connected to the control circuit 17. A portion surrounded by a broken line in FIG. 7 is formed in one body.

Figure 8:
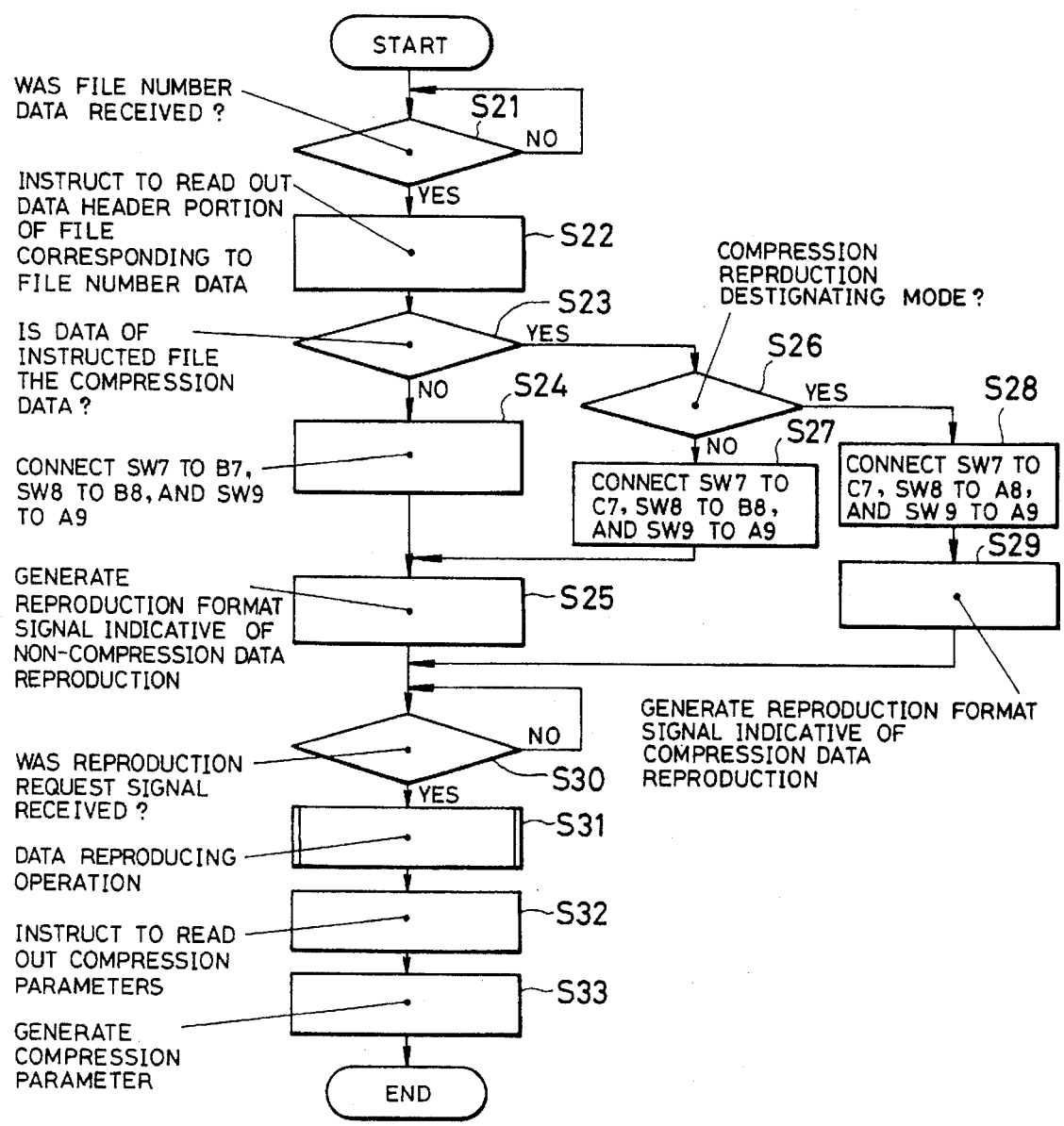
FIG. 8 is a flowchart showing the operation of a control circuit in a system on the reproducing side.
Figure 9:
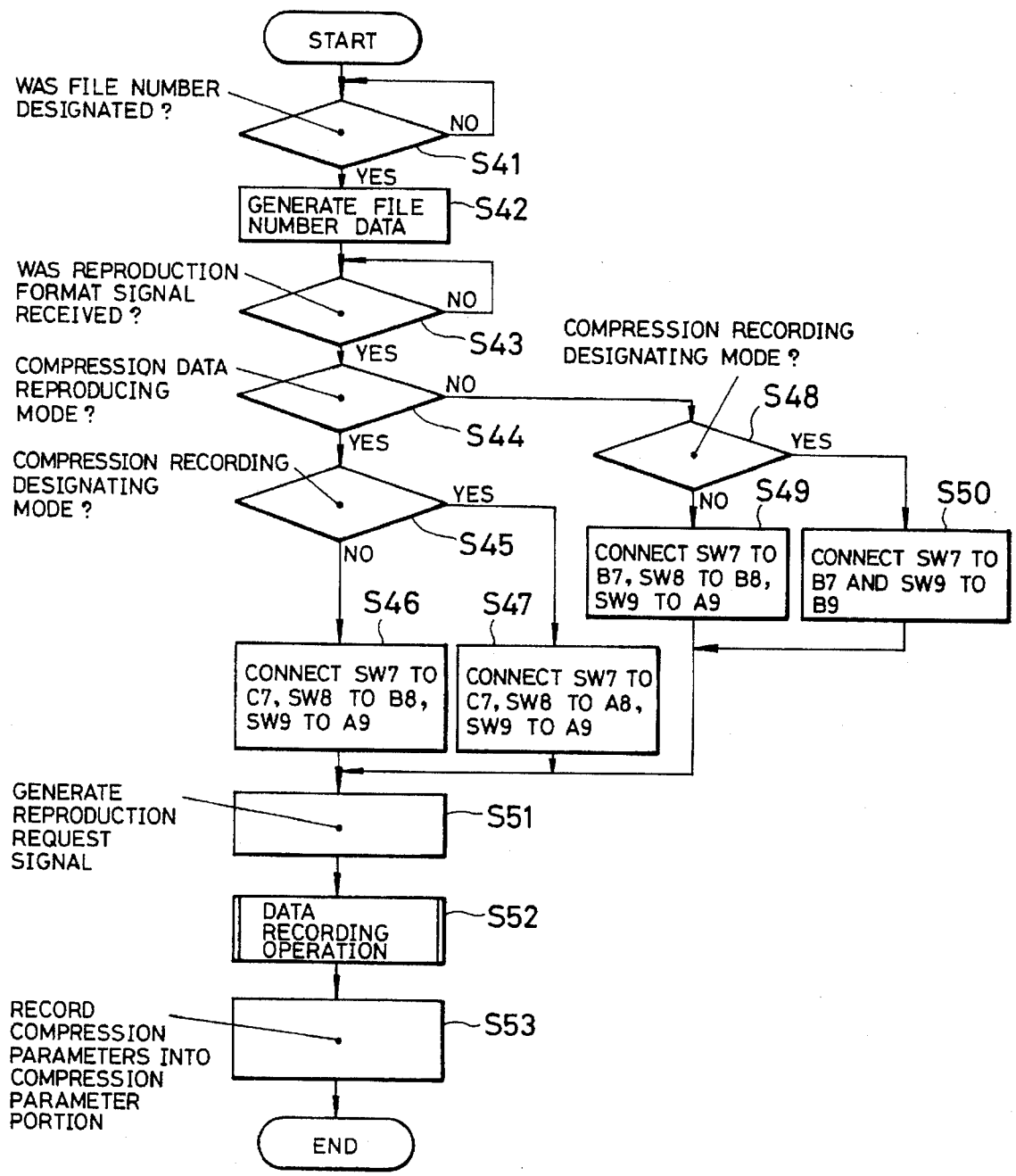
FIG. 9 is a flowchart showing the operation of a control circuit in a system on the recording side.

The Control operation of the control circuit 17 in case of editing the still image data by using the still image filing system according to the invention on each of the reproducing side and recording side will now be described in accordance with flowcharts of FIGS. 8 and 9. FIG. 8 shows the operation on the reproducing side. FIG. 9 shows the operation on the recording side. The analog output terminal AOUT, digital output terminal DOUT, and input/output terminal I/O of the still image filing system on the reproducing side are connected to the analog input terminal AIN, digital input terminal DIN, and input/output terminal I/O of the still image filing system on the recording side, respectively.

On the recording side, the control circuit 17 discriminates whether the file number indicative of the data to be edited has been designated by the user by using the keyboard 18 or not (step S41). When the file number is designated, the file number data is generated from the input/output terminal I/O (step S42).

On the reproducing side, the control circuit 17 checks to see if the file number data has been received or not (step S21). When the file number data is received, the control circuit 17 instructs the disk drive 12 to read out the data header portion of the file corresponding to the received file number data (step S22). The disk drive 12 reads out the information of the data header portion of the designated file number from the disk and supplies to the control circuit 17 in accordance with a data header portion read out command. The control circuit 17 discriminates whether the recorded data is the compression data or not by checking the read-out information of the data head portion (step S23). When it is the non-compression data, the control circuit 17 controls the switches SW7, SW8, and SW9 to the selecting states of the fixed contacts B7, B8, and A9, respectively (step S24). The reproduction format signal indicative of the non-compression data reproduction is generated from the input/output terminal I/O (step S25).

In case of the compression data, a check is made to see if the compression reproduction designating mode has been set or not (step S26). The user can designate the compression reproducing mode by a key operation of the keyboard 18 on the reproducing side. For instance, the setting of the compression reproduction designating mode is indicated by a flag. In the non-compression reproduction designating mode, the control circuit 17 controls the switches SW7, SW8, and SW9 to the selecting states of the fixed contacts C7, B8, and A9, respectively (step S27). After that, step S25 follows. In the compression reproduction designating mode, the control circuit 17 controls the switches SW7, SW8, and SW9 to the selecting states of the fixed contacts C7, A8, and A9, respectively (step S28). A reproduction format signal indicative of the compression data reproduction is generated from the input/output terminal I/O (step S29). After completion of the execution of step S25 or S29, a check is made to see if a reproduction request signal has been supplied to the input/output terminal I/O from the recording side or not (step S30). When the reproduction request signal is supplied, the data reproducing operation is started (step S31). On the reproducing side, the switch SW6 is always set to the selecting state of the fixed contact B6 by the control circuit 17.

On the recording side, the control circuit 17 checks to see if the reproduction format signal has been supplied or not (step S43) after completion of the execution of step S42. When the reproduction format signal is supplied, a check is made to see if the content of the reproduction format signal indicates the compression data reproduction or not (step S44). In case of the compression data reproduction, a check is made to see if the compression recording designating mode has been set or not (step S45). The user can designate the compression recording mode by a key operation by using the keyboard 18 on the recording side. For instance, the setting of the compression recording designating mode is indicated by a flag. In the non-compression recording designating mode, the compression data is converted into the non-compression data and recorded. The control circuit 17, therefore, controls the switches SW7, SW8, and SW9 to the selecting states of the fixed contacts C7, B8, and A9, respectively (step S46). In the compression recording designating mode, the compression data is recorded as it is. The control circuit 17, accordingly, controls the switches SW7, SWS, and SW9 to the selecting states of the fixed contacts C7, AS, and A9, respectively (step S47).

In case of the non-compression data reproduction in step S44, a check is made to see if the compression recording designating mode has been set or not (step S48) in a manner similar to step S45. In the non-compression recording designating mode, since the non-compression data is recorded as it is, the control circuits 17 controls the switches SW7, SW8, and SW9 to the selecting states of the fixed contacts B7, B8, and A9, respectively (step S49). In the compression recording designating mode, since the non-compression data is converted into the compression data and recorded, the control circuit 17 controls the switches SW7 and SW9 to the selecting states of the fixed contacts B7 and B9 (step S50). In case of converting the non-compression data into the compression data and recording, the selecting state of the switch SW8 is not specified. On the recording side, the switch SW6 is always set to the selecting state of the fixed contact A6 by the control circuit 17.

After completion of the execution of either one of steps S46, S47, S49, and S50, the reproduction request signal is generated from the input/output terminal I/O (step S51) and the data recording operation is started (step S52).

That is, on the reproducing side, when the reproduction request signal is supplied, the control circuit 17 starts the data reproducing operation and instructs the disk drive 12 to read out the designated file. Therefore, the compression data or non-compression data of the still image is read out from the disk by the disk drive 12. When the compression data is read out, so long as the operating mode is set in the compression reproduction designating mode, the compression data is sent as it is from the digital output terminal DOUT to the recording side through the fixed contacts B6, A8, and A9 of the switches SW6, SW8, and SW9. In the non-compression reproduction designating mode, the compression data is supplied to the reconstructing device 13 through the fixed contact B6 of the switch SW6 and converted into the non-compression data by the reconstructing device 13. The non-compression data is written into the frame memory 14 at a predetermined writing timing and is, thereafter, read out at a predetermined reading timing. The read non-compression data is sent from the digital output terminal DOUT to the recording side through the fixed contacts B8 and A9 of the switches SW8 and SW9. When the non-compression data is read out, the non-compression data is supplied to the frame memory 14 through the fixed contacts B6 and B7 of the switches SW6 and SW7 and written into the frame memory 14 at a predetermined writing timing. After that, the non-compression data is read out at a predetermined reading timing and sent to the recording side from the digital output terminal DOUT through the fixed contacts B8 and A9 of the switches SW8 and SW9.

On the recording side, when the compression data or non-compression data is sent to the digital input terminal DIN, the control circuit 17 instructs the disk drive 12 to write the data. When the compression data is sent, so long as the operating mode is set into the compression recording designating mode, the compression data is supplied as it is to the disk drive 12 through the fixed contacts A6, A8, and A9 of the switches SW6, SW8, and SW9 and written to the disk. In the non-compression recording designating mode, the transmitted compression data is supplied to the reconstructing device 13 through the fixed contact A6 of the switch SW6 and converted into the non-compression data by the reconstructing device 13. The non-compression data is written into the frame memory 14 at a predetermined writing timing and is, thereafter, read out at a predetermined reading timing. The read non-compression data is supplied to the disk drive 12 through the fixed contacts B8 and A9 of the switches SW8 and SW9 and is written to the disk.

When the non-compression data is sent, so long as the operating mode is set into the compression recording designating mode, the non-compression data is written into the frame memory 14 at a predetermined writing timing through the fixed contacts A6 and B7 of the switches SW6 and SW7. After that, the non-compression data is read out at a predetermined reading timing and supplied to the compressor 16. After the non-compression data was converted into the compression data by the compressor 16, it is supplied to the disk drive 12 through the fixed contact B9 of the switch SW9 and written to the disk. In the non-compression recording designating mode, the transmitted non-compression data is written into the frame memory 14 at a predetermined writing timing through the fixed contacts A6 and B7 0f the switches SW6 and SW7. After that, the non-compression data is read out at a predetermined reading timing and supplied to the disk drive 12 through the fixed contacts B8 and A9 of the switches SW8 and SW9 and written to the disk.

On the recording side, even when the compression data is supplied from the switch SW6 to the disk drive 12 through the switches SW8 and SW9, the reconstructing device 13 and frame memory 14 operate and the still image non-compression data is derived. The non-compression data is converted into the analog video signal by the D/A converter 15 and generated from the output terminal AOUT. The still image, consequently, can be checked by a display device such as a CRT display or the like.

On the reproducing side, after the still image data of the designated file was transmitted to the recording side, the control circuit 17 instructs the disk drive 12 to read out compression parameters from the disk (step S32). The read-out compression parameters are generated from the input/output terminal I/O (step S33). As mentioned above, the compression parameters have been recorded in the compression parameter portion of the disk and consist of an inverse quantization table and a Huffman decoding table.

On the recording side, when the compression parameters are supplied, the control circuit 17 supplies them to the disk drive 12 and records into the compression parameter portion of the disk (step S53). Step S53 is not particularly necessary in the case where no compression data is recorded to the disk and is also unnecessary in the case where the compression parameters have already been recorded.

Figure 10:
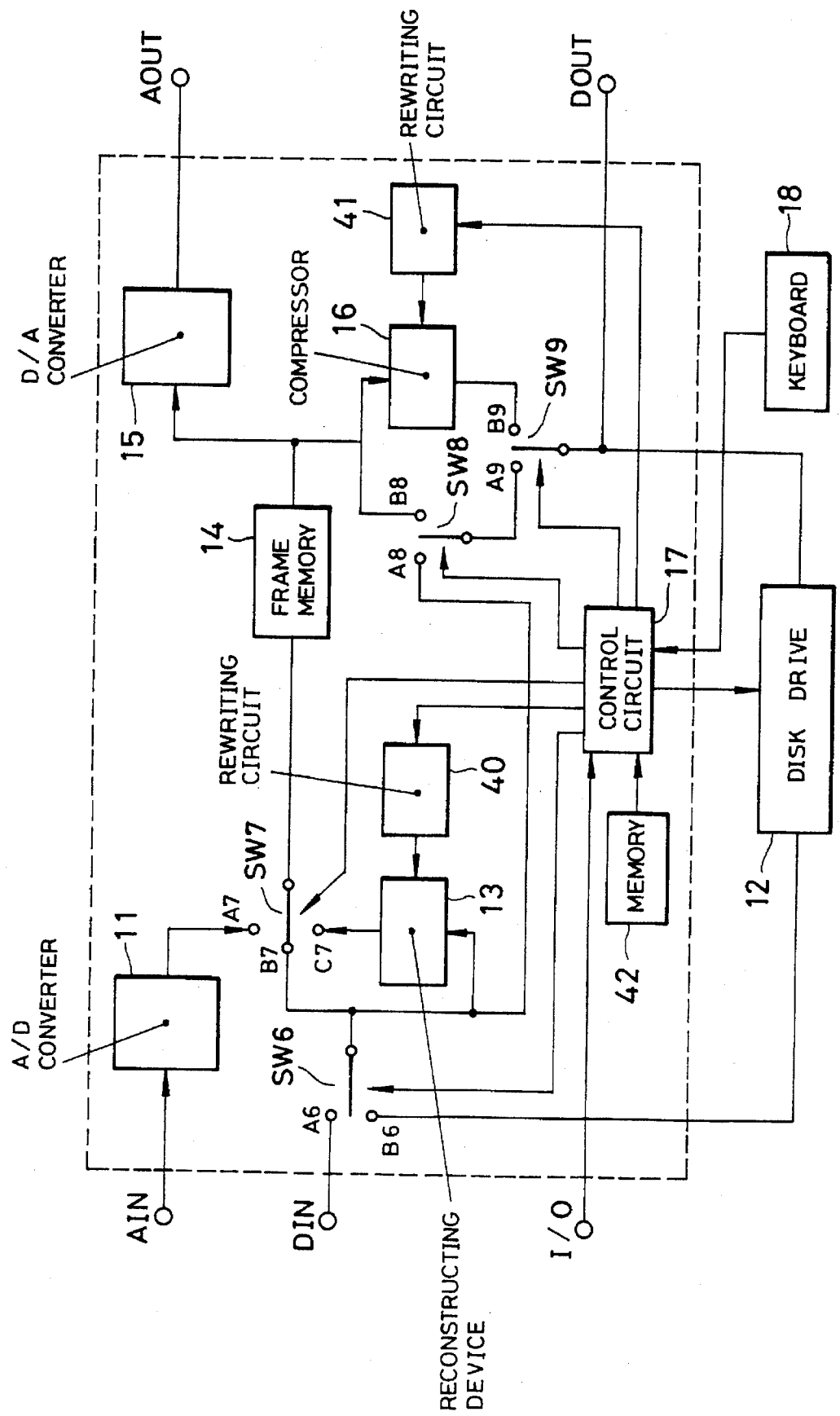
FIG. 10 is a block diagram showing a third embodiment of the invention.

FIG. 10 shows a third embodiment of the invention. In a still image filing system shown in FIG. 10, the same parts and components as those shown in the system of FIG. 7 are designated by the same reference numerals. A compression parameter rewriting circuit 40 is connected to the reconstructing device 13. The rewriting circuit 40 rewrites each table in the table memories 34 and 35 in the reconstructing device 13 shown in FIG. 4 in accordance With a command from the control circuit 17. That is, the inverse quantization table and Huffman decoding table which are used in the entropy decoder 31 and inverse quantizing circuit 32 are rewritten by the compression parameter rewriting circuit 40. A compression parameter rewriting circuit 41 is connected to the compressor 16. The rewriting circuit 41 rewrites each table in the table memories 24 and 25 in the compressor 16 shown in FIG. 3 in accordance with a command from the control circuit 17. The control circuit 17 has a separate memory 42. A quantization table, a Huffman code table, an inverse quantization table, and a Huffman decode table corresponding to a plurality of different compression ratios have previously been written in the memory 42.

Figure 11:
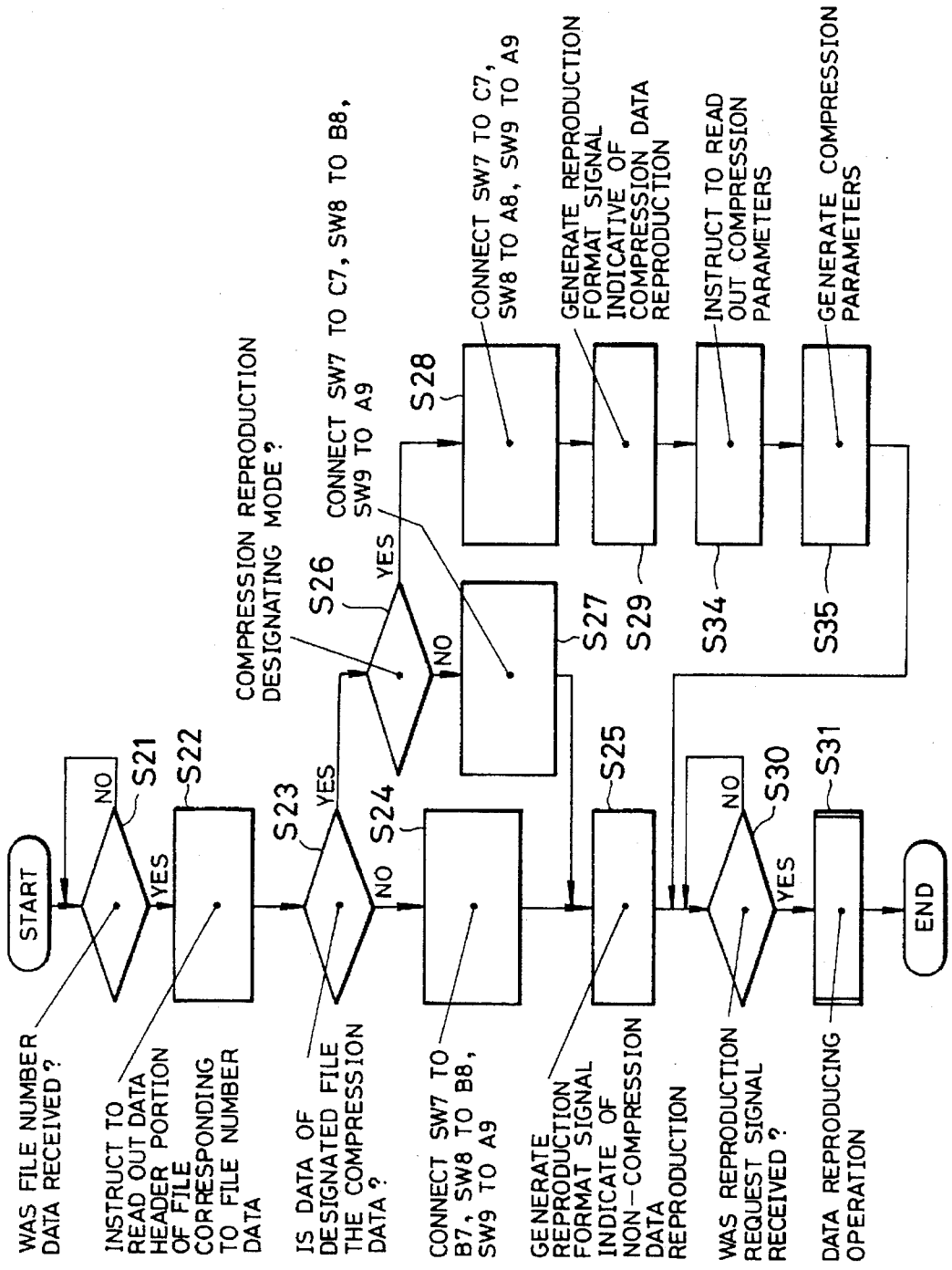
FIG. 11 is a flowchart showing the operation of the control circuit in the system on the reproducing side.

FIG. 11 shows the control operation of the control circuit 17 on the reproducing side of the system of FIG. 10 and the processing steps of the same operations as those shown in FIG. 8 are designated by the same step numbers. After completion of the execution of step S29, the control circuit 17 instructs the disk drive 12 to read out the compression parameters from the disk (step S34). The read-out compression parameters are generated from the input/output terminal I/O (step S35). After that, step S30 follows. On the reproducing side, the still image filing system shown in FIG. 7 can be also used.

Figure 12:
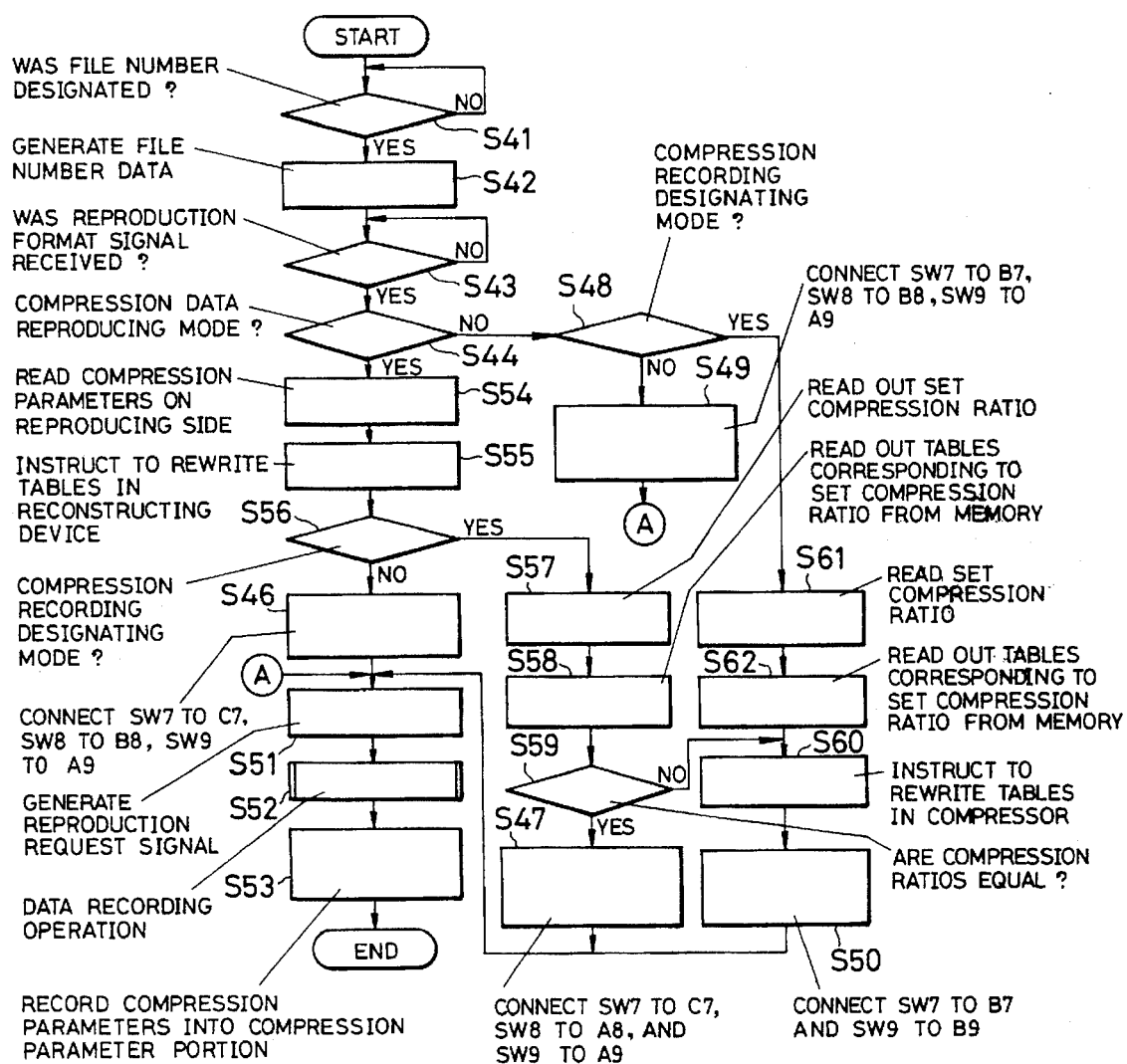
FIG. 12 is a flowchart showing the operation of the control circuit in the system on the recording side.

FIG. 12 shows the control operation of the control circuit 17 on the recording side of the system of FIG. 10 and the processing steps of the same operations as those shown in FIG. 9 are designated by the same step numbers. In case of the compression data reproduction in step S44, the control circuit 17 reads out the compression parameters supplied from the reproducing side, namely, the inverse quantization table and Huffman decode table (step S54) and supplies the read-out inverse quantization table and Huffman decode table to the rewriting circuit 40 and instructs to rewrite the tables in the reconstructing device 13 (step S55). A check is made to see if the recording mode has been set into the compression recording designating mode or not (step S56). In the non-compression recording designating mode, the processing routine advances to steps S46, S51, and S52. The compression data transmitted from the reproducing side, therefore, is supplied to the reconstructing device 13 through the fixed contact A6 of the switch SW6 and converted into the non-compression data in accordance with the compression parameters of the compression data by the reconstructing device 13. The non-compression data is written into the frame memory 14 at a predetermined writing timing. After that, the non-compression data is read out at a predetermined reading timing and supplied to the disk drive 12 through the fixed contacts B8 and A9 of the switches SW8 and SW9 and written to the disk.

If the compression recording designating mode has been set in step S55, the compression ratio set by the key operation of the user by using the keyboard 18 is read (step S57). The tables corresponding to the set compression ratio are read out from the memory 42 (step S58). Each of the above tables and the compression parameters which were supplied from the reproducing side and which are read in step S54, that is, the inverse quantization table and the Huffman decode table are compared, thereby discriminating whether the compression ratios on the reproducing side and recording side are equal or not (step S59). When they are equal, the compression data can be recorded as it is. Therefore, the processing routine advances to step S47 and the control circuit 17 controls the switches SW7, SW8, and SW9 to the selecting states of the fixed contacts C7, A8, and A9, respectively. When the recording mode is in the compression recording designating mode and the compression ratios on the reproducing and recording sides are equal in the case where the compression data is sent, therefore, the compression data is supplied as it is to the disk drive 12 through the fixed contacts A6, A8, and A9 of the switches SW6, SW8, and SW9 and written onto the disk.

When the compression ratios differ, the quantization table and Huffman code table which have been read out in step S58 are supplied to the rewriting circuit 41 and the control circuit 17 instructs rewrite of the tables in the compressor 16 (step S60). The processing routine advances to step S50. That is, when the compression ratios on the reproducing side and recording side differ, the transmitted compression data is supplied through the fixed contact A6 of the switch SW6 to the reconstructing device 13, by which it is once converted into the non-compression data. The non-compression data is written into the frame memory 14 at a predetermined writing timing. After that, the non-compression data is read out at a predetermined reading timing and supplied to the compressor 16. After the non-compression data is converted into the compression data of a set compression ratio by the compressor 16, it is supplied to the disk drive 12 through the fixed contact B9 of the switch SW9 and written to the disk.

When the recording mode is in the compression recording designating mode in step S48, the non-compression data is converted into the compression data and recorded, so that the compression ratio set by the key operation of the user by the keyboard 18 is read (step S61). The quantization table and Huffman code table corresponding to the set compression ratio are read out from the memory 42 (step S62). The processing routine advances to steps S60 and S50. When the non-compression data is transmitted, therefore, so long as the compression recording designating mode has been set, the non-compression data is written into the frame memory 14 at a predetermined writing timing through the fixed contacts A6 and B7 of the switches SW6 and SW7 and is, thereafter, read out at a predetermined reading timing and supplied to the compressor 16. After the non-compression data was converted into the compression data of the set compression ratio by the compressor 16, the compression data is supplied to the disk drive 12 through the fixed contact B9 of the switch SW9 and written to the disk.

In the above embodiment, the discrimination regarding whether the compression ratios on the reproducing side and recording side are equal or not has been executed by comparing the respective tables. If a table number has previously been assigned in correspondence to each compression ratio, however, by comparing the table numbers on the reproducing side and recording side, the discrimination regarding whether the compression ratios on the reproducing side and recording side are equal or not can be also performed.

According to the still image filing system of the invention, on the reproducing side, the reproduction format signal indicating whether the read-out data from the recording medium is the non-compression data or the compression data is generated before the read-out data is generated from the output terminal, and on the recording side, a check is made to see if the data which is supplied is the compression data or not in accordance with the reproduction format signal, and when the result of the discrimination indicates the supply of the compression data, the input terminal is connected to the input of the driving means, and the compression data is recorded as it is to the recording medium by the driving means. When the result of the discrimination indicates the supply of the non-compression data, the input terminal is connected to the compressing means, the output of the compressing means is connected to the input of the driving means, and the non-compression data is converted into the compression data by the compressing means. Thereafter, the compression data is recorded to the recording medium by the driving means. It is, therefore, possible to prevent operations such that after the still image compression data was once reproduced as an analog video signal, it is again compressed and recorded to the recording medium such as a disk or the like. A deterioration of the still video image can be avoided. Before editing, the user does not need to previously check whether the still video image recorded on the recording medium has been recorded by the compression data or not. Even when both of the non-compression data and the compression data exist as digital video signals, all of them can be recorded as compression data. The still image data recorded on the recording medium can be efficiently edited and recorded to another recording medium.

What is claimed is:

1. A still image system comprising:

compressing means for compressing still image data supplied in a data recording mode and generating compressed data;

driving means for recording said compressed data to a recording medium in the data recording mode and for reading out the compressed data recorded on said recording medium in a data reproducing mode;

reconstructing means for reconstructing non-compressed data from the read-out compressed data in the data reproducing mode and for generating reconstruction still image data; and means for supplying the compressed data which is generated from said compressing means, to said reconstructing means in the data recording mode before it is recorded to said recording medium so as to permit the reconstruction still image data to be obtained from said reconstructing means; and at least two frame memories, wherein in the data recording mode, the still image data of one frame is stored into one of said frame memories, the reconstruction still image data of one frame generated by said reconstructing means is stored into the other frame memory, and one of said still image data and said reconstruction still image data in said frame memories is selectively read out and generated in accordance with an operation command.

2. A still image filing system comprising:

compressing means for compressing still image non-compressed data and generating compressed data;

reconstructing means for reconstructing still image non-compressed data from said compressed data;

driving means for recording said compressed data and said non-compressed data which is supplied to a recording medium in a data recording mode and for reading out the recorded said compressed data and said non-compressed data from said recording medium in a data reproducing mode;

an input terminal for receiving data to be recorded; and an output terminal for output of read-out data, wherein said system further comprises:

data format generating means for generating a reproduction format signal indicating whether the read-out data of the recording medium is the non-compressed data or the compressed data in the data reproducing mode before the read-out data is output from said output terminal, first discriminating means for discriminating whether the data which is supplied is the compressed data or not in accordance with said reproduction format signal in the data recording mode, and switching means for connecting said input terminal to an input of said driving means when the result of the discrimination of said first discriminating means indicates the supply of the compressed data, and for respectively connecting said input terminal to said compressing means and the output of said compressing means to the input of said driving means when the discrimination result of said first discriminating means indicates the supply of the non-compressed data.

3. A system according to claim 2, further comprising:

means for generating a compression ratio signal indicative of a first compression ratio of the compressed data when the read-out data of the recording medium is the compressed data in the data reproducing mode prior to generating the read-out data from said output terminal; and second discriminating means for discriminating whether said first compression ratio according to said compression ratio signal and a second compression ratio achieved by said compressing means are equal or not when the discrimination result of said first discriminating means indicates the supply of the compressed data, and wherein when the discrimination result of said second discriminating means indicates different said first compression ratio and said second compression ratio, said switching means connects said input terminal to said reconstructing means and connects the output of said compressing means to the input of said driving means, and said reconstructing means reconstructs the data supplied to said input terminal at an expansion ratio corresponding to said first compression ratio according to said compression ratio signal supplied to said compressing means.

* * * * *